United States Patent [19]

Wallgard

[11] 4,063,699
[45] Dec. 20, 1977

[54] FAIL-SAFE BLOCK CONTROL SYSTEM FOR DRIVERLESS VEHICLES

[75] Inventor: Gunnar A. Wallgard, Huskvarna, Sweden

[73] Assignee: Saab-Scania Aktiebolag, Linkoping, Sweden

[21] Appl. No.: 748,211

[22] Filed: Dec. 7, 1976

[30] Foreign Application Priority Data

Dec. 10, 1975 Sweden .................... 7513891

[51] Int. Cl.² .................. B61L 1/10; B61L 21/08; B61L 21/10
[52] U.S. Cl. .................................. 246/63 R; 104/153
[58] Field of Search .............. 104/153; 246/62, 63 R, 246/63 C, 165, 167 R, 182 R, 182 B, 187

[56] References Cited

U.S. PATENT DOCUMENTS 3,710,100  1/1973  Perry .................... 246/63 C X

Primary Examiner—Stephen G. Kunin
Attorney, Agent, or Firm—Ira Milton Jones & Associates

[57] ABSTRACT

Driverless vehicles move in one direction along a path divided into blocks. Movement command signals are radiated from plural elongated radiators per block, arranged end-to-end, the last in each block a departure radiator wholly within the block. A receiver in each vehicle comprises a memory element established in active condition by a momentary "clear" signal and maintained in active condition by a continuous succession of movement command signals. A departure radiator emits no movement command signals while the block directly ahead of it is occupied, but it emits a "clear" signal and continuous movement command signals when that block is safe for entry. Only departure radiators emit "clear" signals; hence, a vehicle which slides into an occupied block cannot continue moving in that block.

3 Claims, 5 Drawing Figures

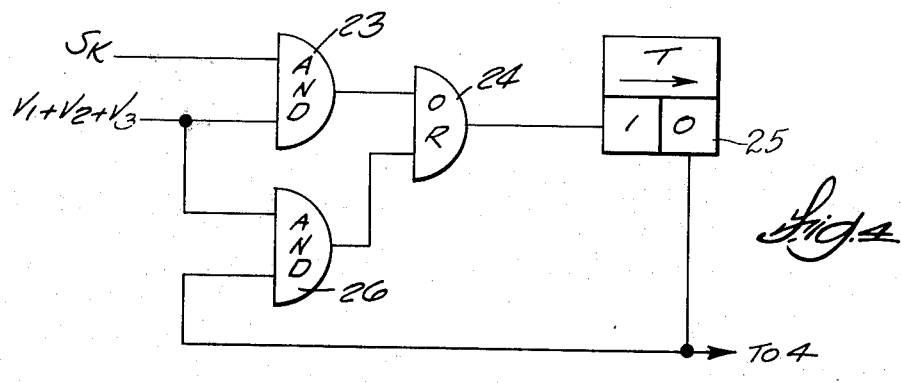
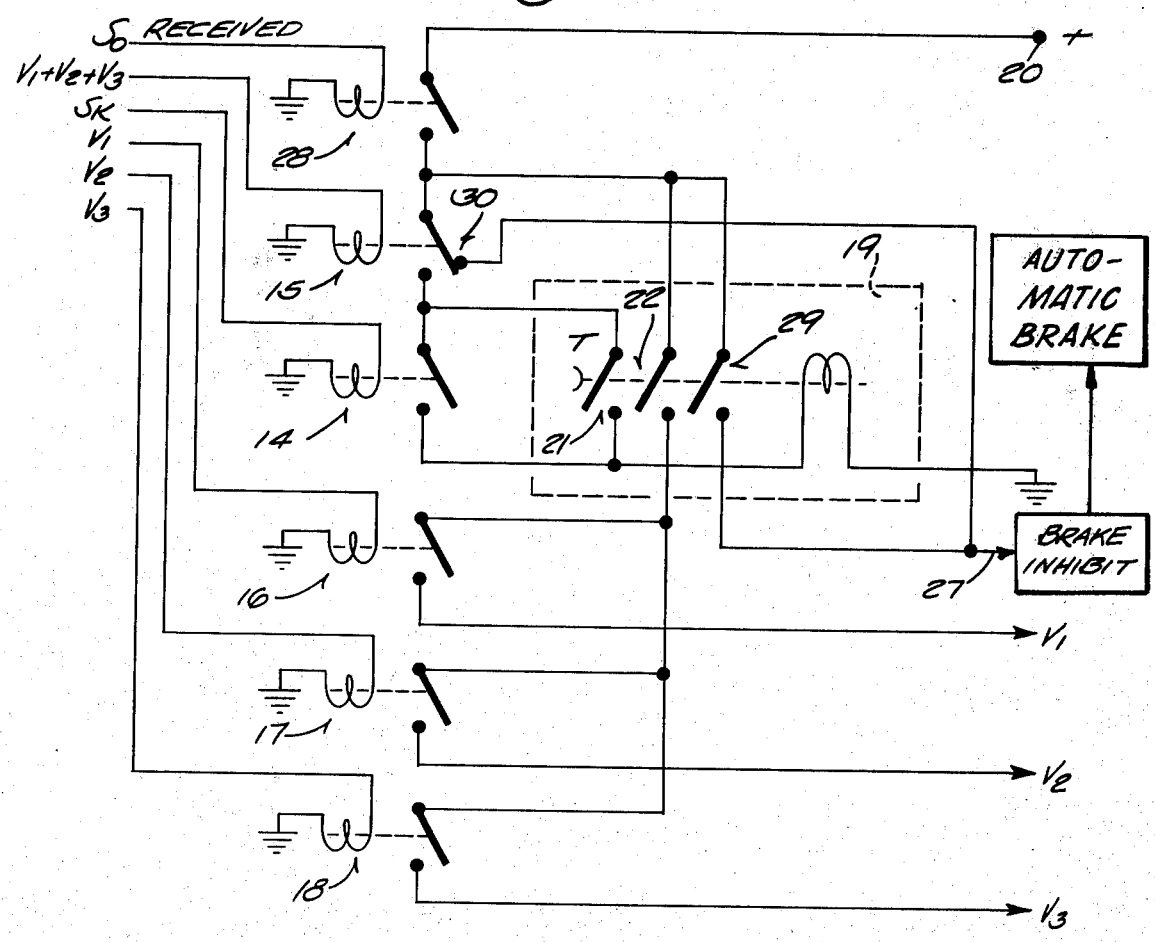

FAIL-SAFE BLOCK CONTROL SYSTEM FOR DRIVERLESS VEHICLES

This invention relates to systems wherein driverless vehicles move in one direction along a track or path that is lengthwise divided into blocks, each block intended to be occupied by only one vehicle at a time, and wherein elongated radiators that extend lengthwise along each block, in end-to-end relation to one another, radiate signals by which the movements of the vehicles are controlled; and the invention is more particularly concerned with means in such a system for assuring that in the event a vehicle, through some failure, enters an occupied block, such vehicle will be unable to progress any substantial distance into that block.

The driverless vehicle control system of the present invention is similar in many respects to the one disclosed in U.S. Pat. No. 3,848,836, to Wallgard et al. In that system, as in the one herein described, an elongated radiating means extends the full length of a path along which vehicles move in one direction. Signals that are detected by the vehicles and utilized for their control are radiated from the radiating means.

The path along which the vehicles move may be defined by tracks on which the vehicles ride; or the path may be defined by the radiating means, in which case the vehicles may steer themselves automatically in response to detection of the signal radiations from it. In either case, the radiating means consists of elongated radiators laid end-to-end along the path, each radiator comprising a cable length or an elongated antenna loop. Each vehicle is responsive only to signals from the radiator nearest it; hence the several vehicles along the path can be individually controlled by impressing different appropriate signals upon the several radiators.

The apparatus is so arranged that a vehicle cannot more unless it is receiving movement command signals, each of which signifies a speed to be maintained. Normally, movement command signals are radiated continuously, each signal being repeated for as long as its remains valid; and thus the absence of movement command signals signifies movement at zero velocity.

For purposes of vehicle control, the path is lengthwise divided into blocks. Each block has a front end which is defined from the rear end of the block next adjacent to it in the direction of vehicle travel by a block boundary. As explained in U.S. Pat. No. 3,848,836, vehicle detectors in the path, located at or near the block boundaries, produce outputs when a vehicle enters a block and leaves it. These outputs are employed to control vehicle movements in such a manner that the presence of a vehicle in a block sets up a condition which is intended to prevent a following vehicle from entering that block as long as it is occupied.

For purposes of block control, there are plural radiators in each block. The radiator in the front end portion of each block is a departure radiator that serves for control of vehicle movements across its adjacent block boundary.

Whenever a block is occupied, the departure radiator in the block directly behind it is prevented from radiating movement command signals, so that a vehicle adjacent to that departure radiator is commanded to stop before it can move across the adjacent block boundary and into the occupied block. In the known systems, a departure radiator is caused to resume radiation of movement command signals as soon as the block ahead of it is vacated, and a vehicle that has been stopped alongside the departure radiator is thereby enabled to resume its motion and proceed into the newly-vacated block.

With such known systems it can happen that a vehicle moving along a departure radiator towards an occupied block fails to stop before reaching the adjacent block boundary, owing to defective brakes, sliding or the like. As it enters the occupied block, the vehicle begins to receive movement command signals intended for the vehicle already in that block; and if it responds to those signals it can move through the block and collide with the vehicle ahead of it.

In general, the object of the present invention is to eliminate the risk of collision in a situation such as has just been described.

Stated more specifically, it is the object of this invention to provide an improved system of the type wherein driverless vehicles move in response to radiated movement command signals that denote speeds to be maintained, and wherein the absence of such movement command signals denotes zero speed, said system being improved in that a vehicle which for any reason moves completely through a block control zone within which it is required to stop, and which thereby crosses a block boundary into a block that it is not authorized to enter, is prevented from continuing to move in the unauthorized block, even though it is receiving movement command signals intended for a vehicle authorized to be in that block.

Those skilled in the art will appreciate that the term "block" is used wherein to denote any defined zone along a vehicle path, which zone is intended to be entered by a vehicle only if conditions prescribed for such entry have been fulfilled. In that sense, the entry to a switch can be regarded as a block, inasmuch as the control system should cause a vehicle to stop at a safe distance ahead of the switch if it is not correctly set for the vehicle, and should cause the vehicle to proceed through the switch if the switch is set correctly.

With the foregoing in mind, it can also be said that it is a general object of this invention to provide a block control system for driverless vehicles that is fail-safe, in that if a vehicle for any reason enters a block when the prescribed conditions for its entry into that block have not been satisfied, the vehicle is prevented from moving any further into that block unless and until it receives a special signal which is transmitted to it only when the resumption of its forward movement is known to be safe.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate several complete examples of embodiments of the invention constructed according to the best modes so far devised for the practical application of the principles thereof, and in which.

Figure 3:
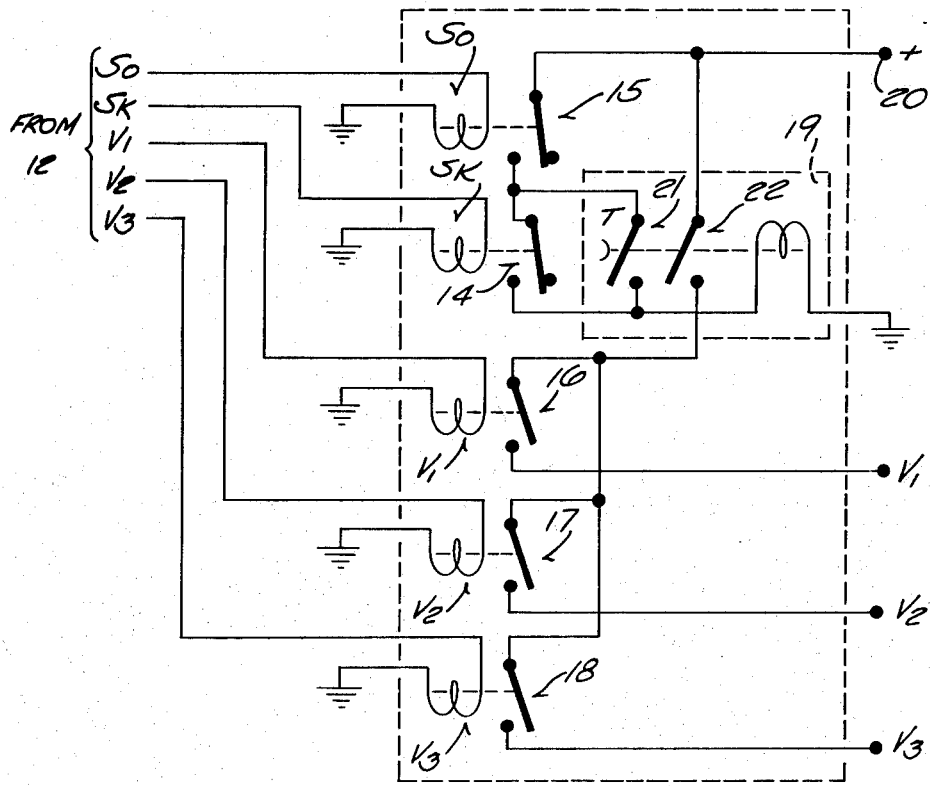
FIG. 3 is a circuit diagram of apparatus comprising relays, constituting one embodiment of the memory and signal gating means in each receiver.

FIG. 4 is a logic system block diagram which is essentially the equivalent of the circuit illustrated in FIG. 3 but which shows how the relay apparatus of that circuit can be replaced by solid-state logic elements to provide what can be considered a modified embodiment of the invention; and FIG. 5 is a circuit diagram generally similar to FIG. 3 but illustrating another modified embodiment of the invention wherein emergency braking of the vehicle occurs under certain conditions.

Referring now to the accompanying drawings, the numeral 1 designates a transmitting unit for generating signals $S_o$ which signify movement commands to be issued to driverless vehicles. Through a connection 5, the transmitter 1 impresses the signals $S_o$ upon a radiator 2 that extends along a path (not shown) to which the vehicles are confined and along which they move in one direction. In the following explanation, it will be understood that the radiator 2 is a departure radiator which is located wholly within a block, and nearest the front boundary of the block, as in the above described known radiator arrangements for driverless vehicles. It will be understood that movement command signals that signify speed demand values are radiated from the radiator 2 only at times when the block immediately ahead of it in the direction of the vehicle travel is in a condition safe for entry of a vehicle into it.

Each vehicle carries a receiver, designated generally by 3, which receives the movement command signals $S_o$ radiated from the radiator nearest which the vehicle is located. The receiver converts those signals into control signals $S_m$ which are fed to a control instrumentality 4 in the vehicle and which, in effect, constitute instructions to the control instrumentality by which the latter, in turn, causes the vehicle and its equipment to execute the various operations denoted by the radiated signals. It will be understood that certain of the command signals $S_o$ may designate vehicle functions such as operation of doors, lights and the like, but in the following description attention will be centered on those of the various possible signals $S_o$ that signify vehicle speed.

In the system of this invention the receiver 3 comprises a memory element 6 which controls a signal gating element 7. The memory element has two conditions, active and inactive. When the memory element is in its active condition, it causes the gating element 7 to pass control signals $S_m$ to the control instrumentality 4; when in its inactive condition it causes the gate 7 to prevent control signals from reaching the control instrumentality. The memory element is established in its active condition by a "clear" signal $S_k$ which can be transmitted only by the transmitter 1, that is, by a departure radiator. Once a "clear" signal is received, the memory element remains in its active condition only as long as it continues to receive movement command signals substantially continuously. Upon any substantial interruption in movement command signals, the memory element reverts to its inactive condition.

At the beginning of operation of a vehicle, a special starting signal is applied to its receiver to establish its memory element 6 in the active condition. The vehicle then moves along the path as long as it continuously receives movement command signals $S_o$ from the several radiators along the path, its speed at any given time being controlled by the movement command signals which it is then receiving. If the vehicle now moves along a departure radiator just ahead of a block occupied by another vehicle, that departure radiator will not be radiating movement command signals, and because of the absence of such signals the memory element 6 will assume its inactive condition and the vehicle will come to a stop. When conditions in the block ahead are such that the vehicle can safely proceed into it, the departure radiator 2 emits a "clear" signals $S_k$ and also resumes emission of movement command signal $S_o$. In response to the "clear" signal, the memory element 6 returns to its active condition and the movement command signals are effective to cause the vehicle to move at the speed they signify.

If the vehicle, instead of stopping while still adjacent to the departure radiator, had slid across the block boundary and into the occupied block, the movement command signals emitted by radiators in that occupied block would not have affected the control instrumentality 4 of the vehicle, owing to the inactive condition of its memory element 6 established during the time that it was moving along the departure radiator and receiving no movement command signals. In that case the vehicle would remain stopped until its memory element 6 was placed in the active condition by a special starting signal, which could be issued by manually controlled means; and of course the starting signal would not be issued to the vehicle unless there was assurance that resumption of its forward motion would be safe.

Figure 1:
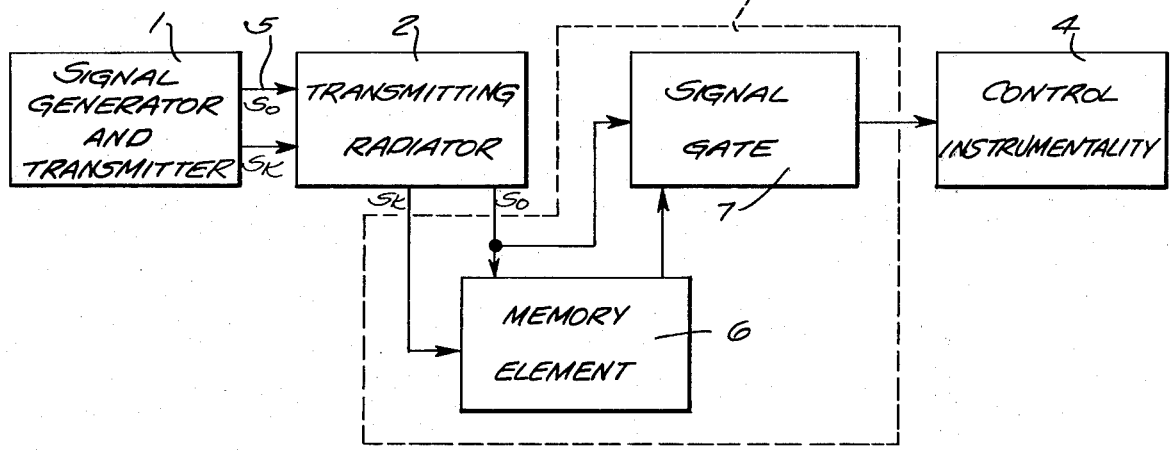
FIG. 1 is a block diagram of the main elements of the control system of the present invention, illustrating the general principles of the invention.
Figure 2:
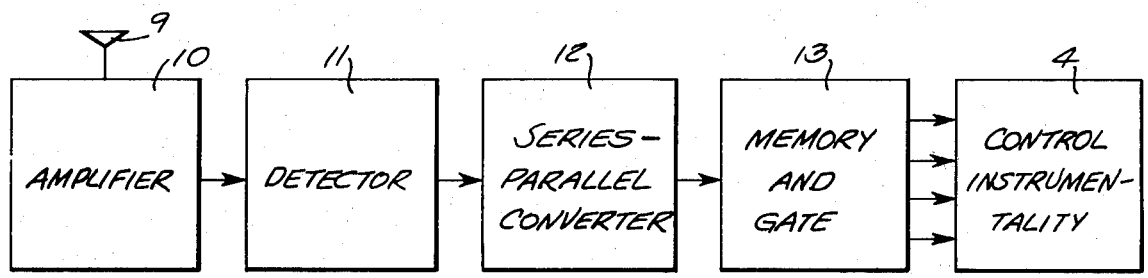
FIG. 2 is a more detailed block diagram of that portion of the apparatus which is carried in each vehicle and which comprises a receiver.

Referring now to FIG. 2, the receiver 3 in each vehicle receives its inputs from a receiving antenna 9. If the signals are emitted as electromagnetic radiations, the antenna 9 can be a more or less conventional loop or the like. If each radiator comprises a conductor in which the signals are manifested as pulsed currents and are radiated in the sense that they can be detected by contact with the conductor at any point along it, then the antenna 9 can comprise a trolley or the like that has sliding contact with the radiator. The receiver 3 comprises an amplifier 10, a detector 11, a series-parallel converter 12 and memory-gate unit 13 which corresponds in function to the memory element 6 and signal gating element 7 of FIG. 1. The output of the memory-gate unit 13 is fed to the control instrumentality 4 of the vehicle.

The movement command signals $S_o$ may be emitted as binary coded signals, each appearing as a series of tones of different frequencies, each frequency having a binary signification. These tone frequencies are detected in the receiving antenna 9, and after being amplified by the amplifier 10, they are converted, in the detector 11, to binary signals in series form. Through parity control and/or control of length of characters and pauses between them, assurance is had that the binary signals are correctly received. In the series-parallel converter 12, to which the output of the detector is fed, the binary signals are converted from series to parallel form so that they can be decoded and converted to analogous demand values to which the control instrumentalities 4 responds.

FIG. 3 illustrates in more detail the memory and gate instrumentalities of the receiver in an embodiment comprising relays. The several relays 14-18, all of which are normally open, have their windings so connected with the series-parallel converter 12 that they are respectively energized in accordance with the binary signal "word" appearing at that converter. The relay 14 is energized and closed when the "clear" signal $S_k$ is received. That signal can be continuously radiated by a departure radiator as long as the requisite conditions in the block head of it are fulfilled. Relay 15, which has its contacts connected in series with the contacts of relay 14, is energized whenever a received control command signal $S_o$ denotes a command for the vehicle to move along the track. For purposes of illustration it is assumed that the vehicle can move forward at any one of three different speeds, denoted by V1, V2 and V3, and therefore a movement command signal represents a demand value for movement at V1, V2 or V3. Relay 16 is energized in response to a V1 demand value signal, relay 17 is energized along with relay 16 in response to a V2 demand value signal, and relay 18 responds to V3, along with relays 16 and 17. It is to be observed that relay 15 is energized in response to any one of the demand value signals V1, V2, V3. A double pole relay 19 performs essentially the same function as the memory element 6 of FIG. 1, and it can be regarded as a memory relay. As the description proceeds, it will also be apparent that relay 19 cooperates with relay 15 to perform the function of the signal gating element 7 in FIG. 2.

Let it be assumed that the vehicle is adjacent to a departure radiator and that the block immediately in front of it is occupied, so that neither movement command signals nor a "clear" signal is received. All of the relays will be open. When the block ahead assumes a condition such that the vehicle can safely enter it, the vehicle receives both a "clear" signal $S_k$ and a speed demand value signal $S_o$ from its adjacent departure radiator, and therefore both of the relays 14 and 15 are energized. Through their contacts, which are connected in series, relays 14 and 15 complete a circuit from a positive energizing terminal 20 to the winding of memory relay 19, to thus close the contacts 21 and 22 of the memory relay and establish the same in its active condition. The contact 21 of the memory relay, which is connected in series with the contact of relay 15, completes a self-holding circuit for the winding of the memory relay, so that the memory relay remains in its active condition so long as movement command signals that signify speed demand values are being received substantially continuously. The other contact 22 of the memory relay completes circuits from the energizing terminal 20 to the V1, V2 and V3 inputs of the control instrumentality, through the respective contactors of the demand value relays 16, 17 and 18. The contactors of relays 16, 17 and 18 are connected in series with one another and with the memory relay contactor 22.

It will be apparent that if the vehicle comes alongside a departure radiator which is not emitting movement command signals that denote speed demand values, the relay 15 will open, breaking the holding circuit for memory relay 19 and causing the latter to open, that is, to assume its inactive condition. As long as the memory relay remains in its inactive condition no inputs can be fed to the control instrumentality input terminals V1, V2 and V3, owing to the open circuit at memory relay contact 22, which breaks the connection between energizing pole 20 and the contacts of the several speed demand value relays 16, 17, 18. Thus, even if the vehicle slides beyond the departure radiator and across the block boundary into the occupied block, movement command signals $S_o$ emitted from radiators in the occupied block will not evoke a response in the vehicle apparatus. It will be apparent that in such a case the memory relay can be returned to its active condition by momentarily closing the relay 14, as with a special signal, at the same time that movement command signals $S_o$ are transmitted to the vehicle to close the relay 15.

It should be mentioned that the memory relay 19 ought to have a predetermined release delay time T, so that it will not assume its inactive condition in case movement command signals are not received for a brief interval by reason of interference or the like.

FIG. 4 illustrates a functional analogue of that part of the circuit of FIG. 3 that comprises relays 14, 15 and 19. In FIG. 4, an AND-gate 23 has two inputs, one for "clear" signals $S_k$, the other for movement command signals that encode speed demand values V1, V2, V3. The output of the AND-gate 23 serves as the input to an OR-gate, which is in turn connected with a monostable flip-flop 25 that has a decay time of T. There is a feedback loop from the output of the flip-flop 25 to one input of a second AND-gate 26, the other input of which receives movement command signals V1, V2, V3. It will be apparent that the flip-flop 25 is established in its active condition by a "clear" signal issued substantially concurrently with movement commands V1, V2, V3 and is maintained in its active condition as long as there is a substantially constant sequence of movement command signals. While the flip-flop remains in its active condition, movement commands can be impressed upon the control instrumentality 4; but if movement command signals are not received during an interval longer than the decay time T, the flip-flop reverts to its inactive condition in which it prevents transfer of demand value signals to the control instrumentality.

In the preceding description it has been assumed that a vehicle enters an already occupied block by reason of a defective braking system or poor braking conditions, and that it has received a zero speed signal (i.e. absence of movement command signals) before crossing the boundary of the occupied block, and that it is responding to the zero speed signal to the extent permitted by circumstances. However, other conditions may cause a vehicle to cross a boundary into an occupied block. For example, a zero speed signal may have been issued and may have been received at the vehicle, but because of some failure in the vehicle control system the vehicle may proceed toward the boundary of the occupied block at a speed other than the commanded zero speed. In such a case the speed of the vehicle might be so high that a normal braking action could not reduce it to zero before the vehicle crossed the boundary into the occupied block.

FIG. 5 illustrates a modified embodiment of the present invention whereby emergency braking occurs, to avoid the possibility of a collision, in the event a vehicle enters an occupied block. For the most part, the circuit of FIG. 5 is identical with that of FIG. 3, as denoted by like reference characters applied to like parts in the two circuit diagrams. It is to be observed that emergency braking should take place only when there is actual danger of a collision, to avoid the wear and tear on the equipment that emergency braking often involves. In the circuit of FIG. 5, it is assumed that the emergency braking device is arranged to fail safe, in that emergency braking occurs automatically in the absence of a brake inhibiting input to the emergency braking device.

The circuit of FIG. 5 includes a normally open relay 28 which has no counterpart in FIG. 3 and which remains energized as long as control command signals are correctly received. As compared with FIG. 3, the memory relay 19 of the FIG. 5 circuit includes an additional normally open contractor 29 which is in series with the contactor of the relay 28, and the speed demand value relay 15 is a double pole relay, having a second contactor terminal 30.

Through the contactor 29 of the memory relay 19 and the contactor of relay 28, a circuit is completed by which current can flow from the positive terminal 20 to the emergency braking device, to inhibit emergency braking, as long as the memory relay 19 remains energized and control command signals are being correctly received to energize relay 28. The second contactor terminal 30 of relay 15 is connected in a circuit with terminal pole 20 that is in series with the contactor of relay 28 and in parallel with the contactor 29 of memory relay 19.

It will be apparent that the brake inhibiting circuit is opened, to permit emergency brake actuation, whenever control command signals are not being correctly received so that relay 28 is de-energized. If the memory relay 19 is de-energized, the branch of the brake inhibiting circuit that comprises contactor 29 of the memory will be opened; but as long as no control signals that denote speed demand values are received, brake inhibiting current will flow through the contractor terminal 30 of relay 15 and the other branch of the brake inhibiting circuit. If, now, the vehicle slides across a boundary into a block occupied by another vehicle, the memory relay 19 will of course remain unenergized, but the relay 15 will be energized in response to the signals denoting speed demand values that are being transmitted to said other vehicle. Since both branches of the brake inhibiting circuit will thus be broken, the emergency braking system will automatically go into action and stop the vehicle.

From the foregoing description taken with the accompanying drawings it will be apparent that this invention provides a fail-safe control system for driverless vehicles whereby a vehicle will normally be stopped before it crosses a block boundary into a block occupied by another vehicle, and whereby it will be prevented from responding to movement command signals transmitted to said other vehicle in the event it should for some reason slide across the boundary of that block.

Those skilled in the art will appreciate that the invention can be embodied in forms other than as herein disclosed for purposes of illustration.

The invention is defined by the following claims:

1. A control system for the automatic control of vehicles that move in one direction along a defined path along which elongated radiators are arranged end-to-end, each vehicle having receiving means comprising detector means for detecting signals radiated from a radiator to which the vehicle is adjacent and a control instrumentality to which detected movement command signals can be transferred and by which the vehicle is caused to move in accordance with demands signified by such signals transferred to the control instrumentality, said path being divided into longitudinally adjacent blocks, each comprising a plurality of said radiators and intended to be occupied by only one vehicle at a time, each block having a front end which is defined from a rear end of the block next adjacent to it in said direction by a block boundary, and the radiator in the front end portion of each block being a departure radiator which extends in said direction only to its adjacent block boundary and from which no movement command signals are radiated when the next adjacent block in said direction is occupied by a vehicle, said control system being characterized by the receiving means in each vehicle further comprising:

A. an enabling means for detecting a special "clear" signal that can be radiated only from a departure radiator along with movement command signals, and for producing an enabling output in response to a detected "clear" signal;

B. A monostable memory element having active and inactive conditions,
  1. said memory element being connected and arranged to permit detected movement command signals to be transferred to the control instrumentality only when the memory element is in its active condition,
  2. said memory element being connected with the enabling means and being responsive to an enabling output therefrom to assume its active condition; and C. means so connecting the detector means with the memory element that the memory element is maintained in its active condition only by a substantially continuous succession of movement command signals received after an enabling output is fed to the memory element, so that the memory element reverts to its inactive condition in consequence of a substantial interruption in the detection of movement command signals and thus renders the control instrumentality non-responsive to subsequently detected movement command signals until such time as the enabling means again detects a "clear" signal.

2. The system of claim 1, further characterized by the memory element being arranged to revert to its inactive condition after a predetermined time delay following cessation of the detection of movement command signals.

3. The system of claim 1, wherein the vehicle has emergency braking apparatus that can effect braking of the vehicle automatically, and two-condition brake inhibiting means operatively associated with the emergency braking apparatus and normally in a condition to prevent vehicle braking, further characterized by:

means connected with the memory element, with the detector means and with said brake inhibiting means, for causing the brake inhibiting means to assume its other condition, permitting automatic braking of the vehicle, when the memory element is in its inactive condition and at the same time movement command signals are detected that signify a movement of the vehicle.

* * * * *